US010795872B2

(12) United States Patent
Danilov et al.

(10) Patent No.: US 10,795,872 B2
(45) Date of Patent: Oct. 6, 2020

(54) INCREMENTAL BLOOM FILTER REBUILD FOR B+ TREES UNDER MULTI-VERSION CONCURRENCY CONTROL

(71) Applicant: EMC IP Holding Company LLC, Hopkinton, MA (US)

(72) Inventors: Mikhail Danilov, Saint Petersburg (RU); Mikhail Malygin, Saint Petersburg (RU); Ivan Tchoub, Saint Petersburg (RU); Alexander Fedorov, Saint Petersburg (RU); Nikita Gutsalov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 879 days.

(21) Appl. No.: 15/398,832

(22) Filed: Jan. 5, 2017

(65) Prior Publication Data

US 2018/0004786 A1 Jan. 4, 2018

(30) Foreign Application Priority Data

Jun. 29, 2016 (RU) .................. 2016125853

(51) Int. Cl.
| | |
|---|---|
| G06F 16/22 | (2019.01) |
| G06F 12/02 | (2006.01) |
| G06F 7/36 | (2006.01) |
| G06F 16/245 | (2019.01) |
| G06F 16/23 | (2019.01) |

(52) U.S. Cl.
CPC ............ *G06F 16/2246* (2019.01); *G06F 7/36* (2013.01); *G06F 12/0261* (2013.01); *G06F 12/0269* (2013.01); *G06F 16/2329* (2019.01); *G06F 16/245* (2019.01); *G06F 2212/1024* (2013.01)

(58) Field of Classification Search
CPC ............ G06F 16/2246; G06F 16/2329; G06F 16/245; G06F 7/36; G06F 12/0261; G06F 12/0269; G06F 2212/1024
See application file for complete search history.

(56) References Cited

U.S. PATENT DOCUMENTS

| | | | |
|---|---|---|---|
| 6,070,003 A | 5/2000 | Gove et al. | |
| 6,550,035 B1 | 4/2003 | Okita | |
| 6,910,213 B1 * | 6/2005 | Hirono | G06F 9/4843 718/108 |

(Continued)

OTHER PUBLICATIONS

Hua et al., "BR-Tree: a scalable prototype for supporting multiple queries of multidimensional data," IEEE Transactions on Computers 58.12 (2009): 1585-1598. (Year: 2009).*

(Continued)

*Primary Examiner* — Jay A Morrison
(74) *Attorney, Agent, or Firm* — Daly, Crowley, Mofford & Durkee, LLP (57) ABSTRACT

A method comprising: processing an update to a search tree and updating statistics, the search tree storing information about one or more objects indexed by corresponding object keys; determining to rebuild a first Bloom filter based on the statistics, the first Bloom filter associated with the search tree; generating a second Bloom filter associated with the search tree; populating the second Bloom filter as part of a tracing garbage collection process; and replacing the first Bloom filter with the second Bloom filter.

12 Claims, 8 Drawing Sheets

(56) References Cited

U.S. PATENT DOCUMENTS

| | | | |
|---|---|---|---|
| 7,549,110 | B2 | 6/2009 | Stek et al. |
| 7,559,007 | B1 | 7/2009 | Wilkie |
| 7,581,156 | B2 | 8/2009 | Manasse |
| 8,458,515 | B1 | 6/2013 | Saeed |
| 8,532,212 | B2 | 9/2013 | Ito |
| 8,683,296 | B2 | 3/2014 | Anderson et al. |
| 8,683,300 | B2 | 3/2014 | Stek et al. |
| 8,762,642 | B2 | 6/2014 | Bates et al. |
| 8,914,706 | B2 | 12/2014 | Anderson |
| 9,448,927 | B1 * | 9/2016 | Agarwala ............ G06F 12/0253 |
| 10,133,638 | B1 * | 11/2018 | Sakdeo ............... G06F 11/1451 |
| 2005/0038968 | A1 | 2/2005 | Iwamura et al. |
| 2006/0105724 | A1 | 5/2006 | Nakao |
| 2006/0147219 | A1 | 7/2006 | Yoshino et al. |
| 2008/0126357 | A1 | 5/2008 | Casanova et al. |
| 2009/0112953 | A1 | 4/2009 | Barsness et al. |
| 2010/0091842 | A1 | 4/2010 | Ikeda et al. |
| 2010/0180176 | A1 | 7/2010 | Yosoku et al. |
| 2010/0246663 | A1 | 9/2010 | Citta et al. |
| 2011/0053639 | A1 | 3/2011 | Etienne Suanez et al. |
| 2011/0055494 | A1 | 3/2011 | Roberts et al. |
| 2011/0196900 | A1 | 8/2011 | Drobychev et al. |
| 2012/0051208 | A1 | 3/2012 | Li et al. |
| 2012/0106595 | A1 | 5/2012 | Bhattad et al. |
| 2013/0067187 | A1 | 3/2013 | Moss et al. |
| 2013/0138646 | A1 * | 5/2013 | Sirer ....................... G06F 16/27 707/736 |
| 2014/0046997 | A1 | 2/2014 | Dain et al. |
| 2016/0239384 | A1 | 8/2016 | Slik et al. |
| 2017/0046127 | A1 | 2/2017 | Fletcher et al. |

OTHER PUBLICATIONS

U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
U.S. Non-Final Office Action dated Feb. 2, 2018 for U.S. Appl. No. 15/398,826; 16 Pages.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/281,172, filed Sep. 30, 2016, Trusov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
Response to U.S. Non-Final Office Action dated Nov. 27, 2017 for U.S. Appl. No. 15/186,576; Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.

* cited by examiner

INCREMENTAL BLOOM FILTER REBUILD FOR B+ TREES UNDER MULTI-VERSION CONCURRENCY CONTROL

CROSS REFERENCE TO RELATED APPLICATIONS

This application claims priority to Russian Patent Application number 2016125853, filed Jun. 29, 2016, and entitled "INCREMENTAL BLOOM FILTER REBUILD FOR B+ TREES UNDER MULTI-VERSION CONCURRENCY CONTROL," which is incorporated herein by reference in its entirety.

BACKGROUND

Many storage systems use search trees (e.g., B+ trees) to provide efficient access to stored data. Distributed storage systems (or "clusters") may manage thousands of search trees, each having a very large number (e.g., millions or even billions) of elements. Large search trees are typically stored to disk or other type of non-volatile storage device.

Some storage systems provide multi-version concurrency control (MVCC) of search trees, which allows multiple users to access and modify a tree concurrently. To provide MVCC with search trees, a storage system may treat elements of a search tree as immutable. Under MVCC, a single change to a search tree may require updating many nodes. In the case of a B+ tree, which includes a root node, internal nodes, and leaves, a tree update may require generating a new leaf to store the data, a new root node, and possibly new internal nodes. Such tree updates many result in unused tree elements on disk and, thus, storage systems typically include a process for detecting and reclaiming unused tree elements (referred to as "garbage collection").

Some storage systems use Bloom filters to reduce the cost of searching large trees stored on disk. A Bloom filter is a probabilistic data structure that can be used to test whether some element is a member of a set. False positive matches are permitted, but not false negatives. Elements may be added to the Bloom filter's set, but cannot be removed. The reliability of a Bloom filter may decrease as elements are added to the set and/or removed from the set.

SUMMARY

According to embodiments of the disclosure, a process for use in a storage system may determine if a Bloom filter that is associated with a search tree should be rebuilt based on certain statistics. If a determination is made to rebuild the Bloom filter, the rebuild may occur during a subsequent tracing garbage collection process for the corresponding search tree.

According to an aspect of the disclosure, a method comprises: processing an update to a search tree and updating statistics, the search tree storing information about one or more objects indexed by corresponding object keys; determining to rebuild a first Bloom filter based on the statistics, the first Bloom filter associated with a search tree; generating a second Bloom filter associated with the search tree; populating the second Bloom filter as part of a tracing garbage collection process; and replacing the first Bloom filter with the second Bloom filter.

In some embodiments, processing the update to the search tree and updating statistics comprises: if the update includes adding an object to the search tree, adding information about the object to the search tree indexed by a corresponding object key, adding the object key to the first Bloom filter, incrementing a tree object count, and incrementing a filter object count; and if the update includes deleting an object to the search tree, deleting information about the object from the search tree and decrementing the tree object count.

In certain embodiments, the method may further comprise determining a target object count for the search tree, wherein determining to rebuild the first Bloom filter based on the statistics comprises determining to rebuild the first Bloom filter based on comparing the target object count and the tree object count. In some embodiments, generating the first Bloom filter comprises generating the first Bloom filter having a capacity determined using the target object count for the search tree.

In particular embodiments, the method may further comprise determining an estimated accuracy for the first Bloom filter using the tree object count and the filter object count, wherein determining to rebuild the first Bloom filter based on the statistics comprises determining to rebuild the first Bloom filter based on comparing the estimated accuracy to a threshold value.

In some embodiments, populating the second Bloom filter as part of the tracing garbage collection process comprises traversing nodes of the search tree and adding object keys to the second Boom filter in response to traversing the nodes of the search tree.

In certain embodiment, the method may further comprise: in response to pausing the garbage collection process, setting a checkpoint at a last object key traversed; and in response to resuming the garbage collection process, adding object keys behind the checkpoint to the second Bloom filter.

According to another aspect of the disclosure, a system may include one or more processors, a volatile memory, and a non-volatile memory storing computer program code that when executed on the processor causes execution across the one or more processors of a process operable to perform embodiments of the method described above.

According to yet another aspect of the disclosure, a computer program product tangibly embodied in a non-transitory computer-readable medium may store program instructions that are executable to perform embodiments of the method described above.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. In certain embodiments, the phrases "computer," "computing system," "computing environment," "processing platform," "data memory and storage system," and "data memory and storage system environment" are intended to be broadly construed so as to encompass private or public cloud computing or storage systems, or parts thereof, as well as other types of systems comprising distributed virtual infrastructure and those not comprising virtual infrastructure. In some embodiments, the terms "application," "program," "application program," and "computer application program" may refer to any type of software application, including desktop applications, server applications, database applications, and mobile applications.

In certain embodiments, the term "storage device" refers to any non-volatile memory (NVM) device, including hard disk drives (HDDs), flash devices (e.g., NAND flash devices), and next generation NVM devices, any of which may be accessed locally and/or remotely (e.g., via a storage attached network (SAN)). In some embodiments, the term "storage device" can also refer to a storage array comprising one or more storage devices.

Figure 1:
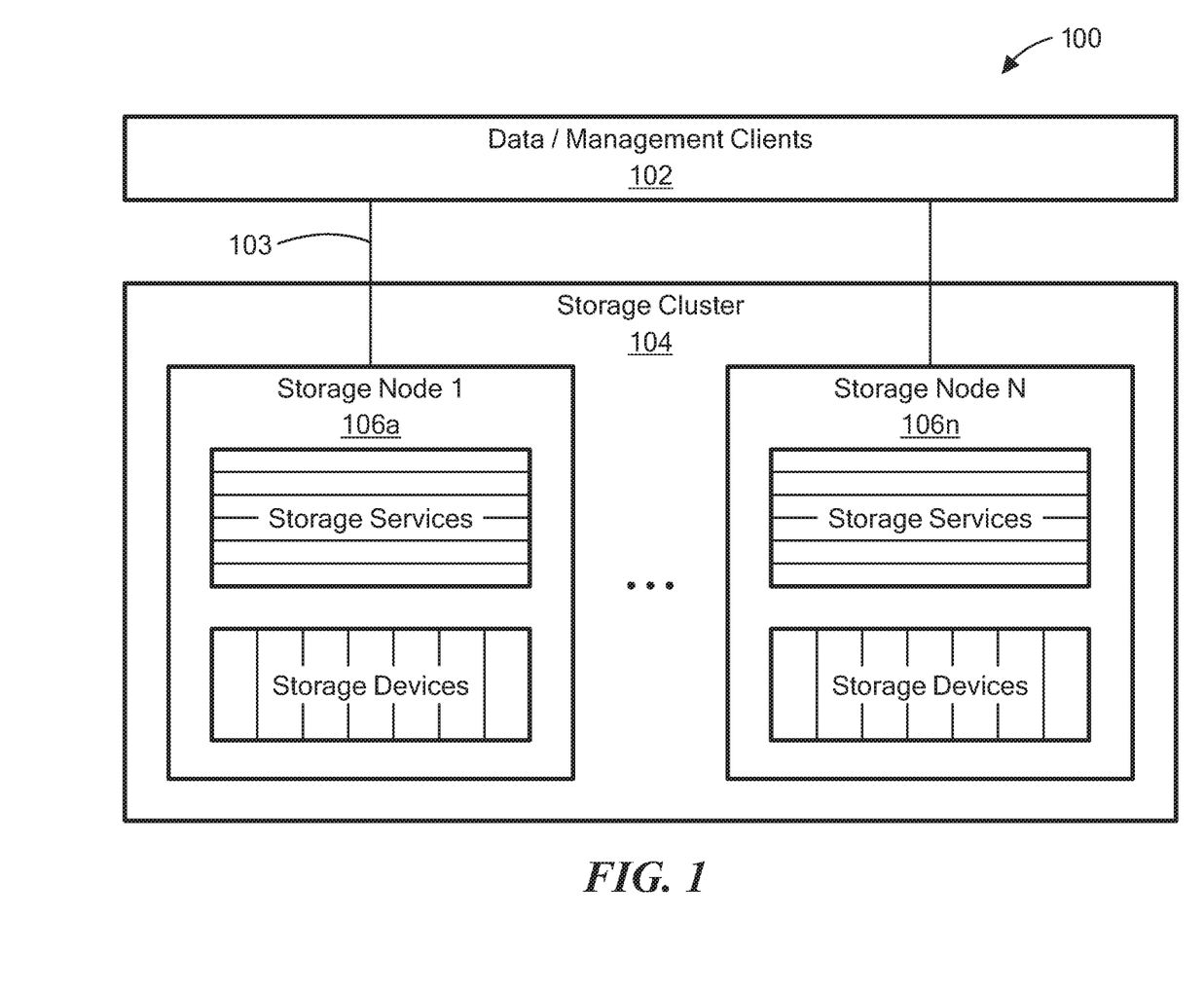
FIG. 1 is a block diagram of an illustrative storage system, in accordance with an embodiment of the disclosure.

FIG. 1 shows a storage system 100, in accordance with an embodiment of the disclosure. The storage system 100 includes one or more clients 102 in communication with a storage cluster 104 via a network 103. The storage cluster 104 includes one or more storage nodes 106a . . . 106n (generally denoted 106). In general operation, clients 102 issue requests to the storage cluster 104 to read and write data. A given request is received by any available storage node 106. The receiving node 106 processes the request locally and/or delegates request processing to one or more other nodes 106.

In some embodiments, the network may include any suitable type of communication network or combination thereof, including networks using protocols such as Ethernet, Internet Small Computer System Interface (iSCSI), Fibre Channel (FC), and/or wireless protocols. In certain embodiments, clients may include user applications, application servers, data management tools, and/or testing systems. In particular embodiments, a storage node may be the same as or similar to an embodiment shown in FIG. 1A and described below in conjunction therewith. In some embodiments, the storage cluster may utilize Elastic Cloud Storage (ECS) from EMC Corporation of Hopkinton, Mass.

In some embodiments, client data may be split into fixed size pieces (referred to herein as "chunks") for storage within the cluster 104. In some embodiments, padding can be added to a chunk to ensure that that all chunks are of equal size.

In particular embodiments, the system 100 can use erasure coding to protect against data loss. In certain embodiments, the system 100 may reduce the amount of processing and time required to perform erasure coding by utilizing techniques described below in conjunction with FIGS. 3 and 4.

Figure 1A:
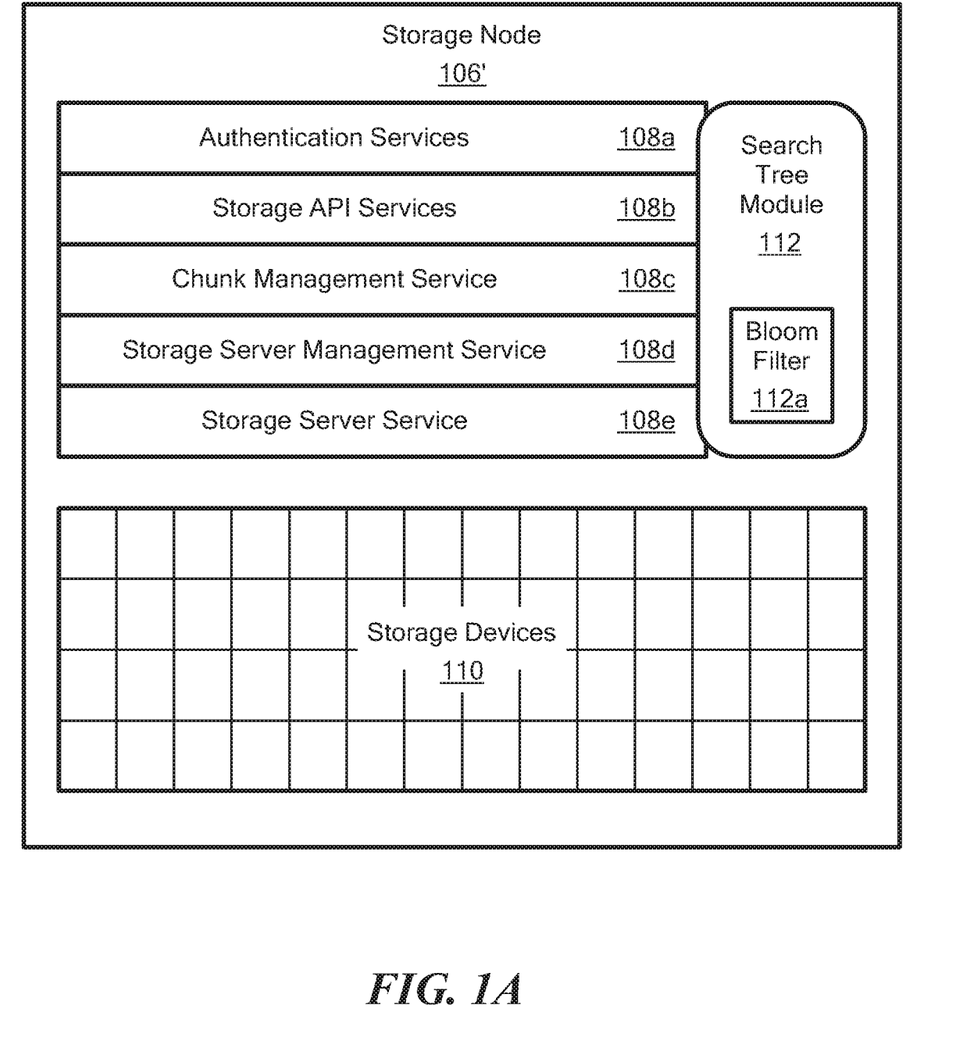
FIG. 1A is a block diagram of an illustrative storage node, which may form a part of the storage system of FIG. 1, in accordance with an embodiment of the disclosure.

FIG. 1A shows an illustrative storage node 106', in accordance with an embodiment of the disclosure. The storage node 106' includes one or more services 108, one or more storage devices 110, and a search tree module 112. The services 108 include: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

The search tree module 112 includes hardware and/or software to provide search tree management and operations to the various services 108. In various embodiments, the search tree module 112 is provided as a library that is accessible by services 108.

In one embodiment, the storage node may include a processor and a non-volatile memory storing computer program code that when executed on the processor causes the processor to execute processes operable to perform functions of the services.

Referring again to FIG. 1A, the search tree module includes a Bloom filter processor 112a configured to maintain one or more Bloom filters associated with search trees. In some embodiments, the Bloom filter processor may be configured to determine when Bloom filter should be rebuilt and to rebuild Bloom filters as part of a tracing garbage collection process. In certain embodiments, the search tree module and/or Bloom filer processor implement processing described below in conjunction with FIGS. 2-5.

In some embodiments, storage devices may comprise one or more physical and/or logical storage devices attached to the storage node. In certain embodiments, storage devices may be provided as a storage array. In particular embodiments, storage devices may be provided as VNX or Symmetrix VMAX, which are available from EMC Corporation of Hopkinton, Mass.

Figure 2:
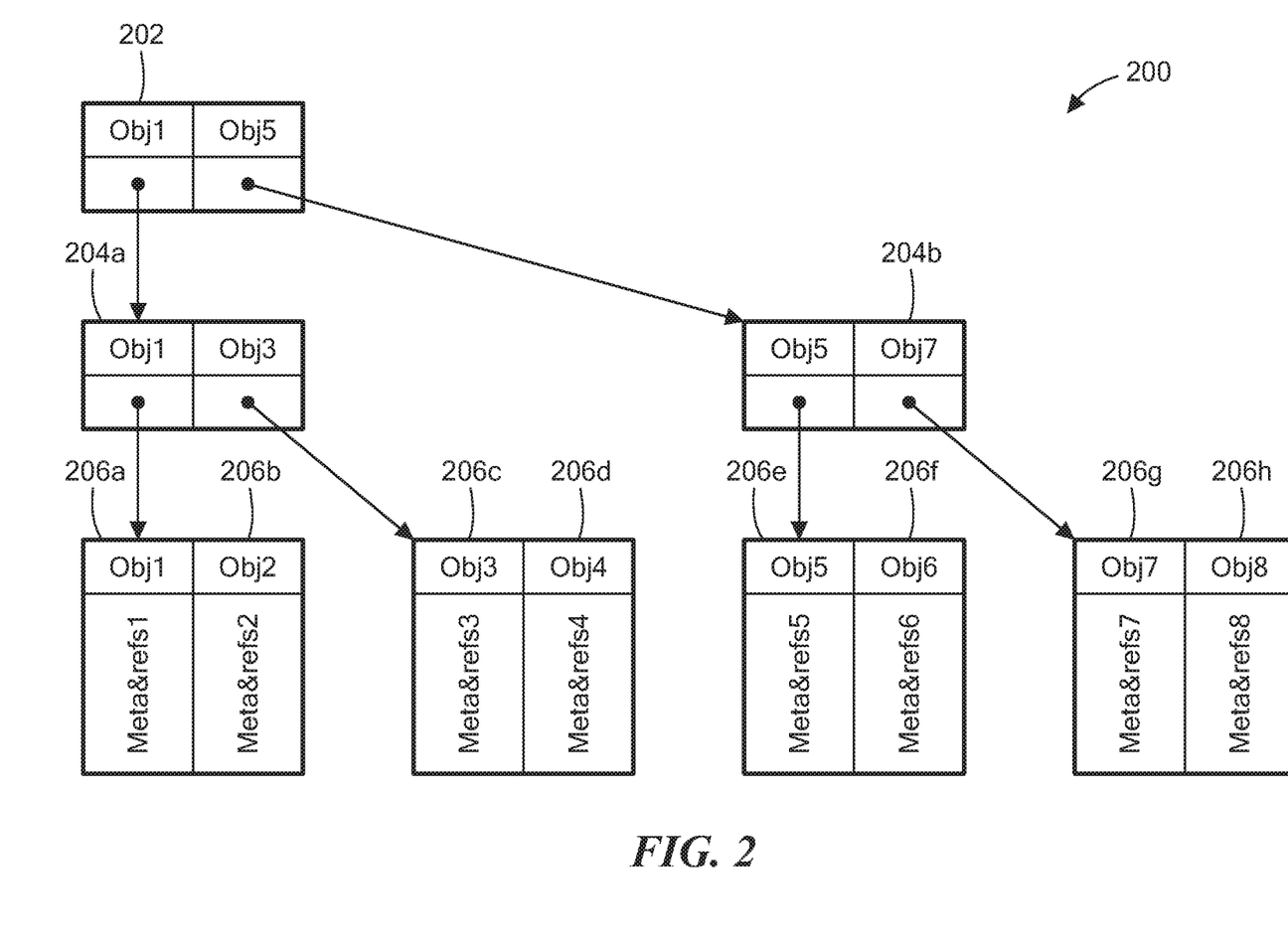
FIG. 2 is a diagram of an illustrative search tree, in accordance with an embodiment of the disclosure.

Referring to FIG. 2, and also with reference to FIGS. 1 and 1A, storage node services 108 may maintain and/or utilize tables of key-value pairs. In some embodiments, a table may be shared across multiple storage nodes 106 (and, in some cases, all storage nodes 106) of a storage cluster 104. Individual storage nodes 106 may maintain a local copy of the table. A given storage node 106 may add/delete/modify a table entries, and then propagate the changes to peer nodes 106. To guarantee data consistency, a table may be owned by one of the storage cluster nodes 106. Non-owner nodes 106 can read from the shared table, however only the owner node can modify it. Table ownership can migrate from one node to another, for example when nodes are added to, or removed from, the storage cluster. In one embodiment, the above-described functionality may be provided by the search tree module 112.

In certain embodiments, to provide efficient access to an arbitrary number key-value pairs, a table may be implemented as a search tree. In particular embodiments, a table may be implemented as a B+ tree.

FIG. 2 shows an example of a search tree in accordance with an embodiment of the disclosure. A search tree 200 includes a root node 202, internal nodes 204 (here, two internal nodes 204a and 204b), and leaves 206 (here, eight leaves 206a-206h). The nodes 202, 204 and leaves 206 are collectively referred to herein as "tree elements." A search tree 200 can include an arbitrary number of tree elements.

Each tree element stores one or more key-value pairs. The keys are referred to as "search keys." The information stored within a tree element's value depends on the type of tree element. Within a root node 202 and internal nodes 204, values are references to other nodes 204 or to leaves 206. For example, internal node 204a includes two key-value pairs: search key "Obj1" references leaf 206a and search key "Obj3" references leaf 206c. Within leaves 206, values correspond to the actual data stored by the search tree.

In some embodiments, a search tree may store information about one or more objects. Within such a search tree, sometimes referred to as an "object table," search keys may correspond to object keys (or "object IDs") and leaf values may correspond to object information. In certain embodiments, leaf values may correspond to object metadata and object data references (i.e., information describing the location of object data within one or more storage devices 110). For example, as shown in FIG. 2, leaf 206a may store metadata for object key "Obj1" in addition to the location of that object's data on disk.

In many embodiments, a search tree may include millions or even billions of tree elements.

In some embodiments, a search tree may be stored within a block storage device, such as a hard disk. The block storage device can be partitioned into a plurality of equal-sized storage chunks. Each element of a search tree may be stored within continuous portion of a storage chunk referred to as a "page." The size of a page may vary depending on the data stored within the respective tree element.

In certain embodiments, to provide multi-version concurrency control (MVCC), elements of a search tree (and, thus, pages) may be treated as immutable. In such embodiments, new data can be appending to an existing storage chunk, but existing data cannot be modified; if a user changes data within a search tree 200, new pages may be allocated for the modified tree elements. In some embodiments, where the search tree is implemented as a B+ tree, it may be necessary to allocate pages for: (1) a new leaf for the new/modified user data; (2) a new root node; and (3) at least N−2 internal nodes, where N is the current depth of the search tree. In such embodiments, the new root node and internal nodes may be configured to provide a search path to the new leaf In some embodiments, a search tree update may result in the creation of a new tree that shares elements with a pre-existing search tree.

In various embodiments, a search tree update may result in unreferenced tree elements and wasted storage capacity allocated for the corresponding pages. In certain embodiments, garbage collection may be performed to reclaim unused storage space allocated for a search tree. In some embodiments, a garbage collector may detect referenced (or "live") tree elements (i.e., nodes and leaves) via tracing. In some embodiments, for each search tree, tracing may begin with the root node and use depth-first traversal to detect all elements that are currently referenced (or "live"). In many embodiments, elements that are not referenced may be considered garbage and the corresponding storage capacity may be reclaimed. In certain embodiments, this technique is referred to herein as a "tracing garbage collection process" and may be implemented within a so-called "tracing garbage collector."

In some embodiments, to reduce I/O costs, search tree updates may be performed in bulk (i.e., updates may be batched). In certain embodiments, a search tree may be associated with a fix-sized journal of tree updates; when the journal becomes full, the tree updates in the journal may be processed together in order to amortize the total cost of the tree updates.

In some embodiments, journal processing may commence while a tracing garbage processing is running. In certain embodiments, the tracing garbage collection process may pause while journal processing is running; after journal processing completes, tracing may resume on the updated search tree. In some embodiments, a checkpoint may be used to resume tracing from the same element it paused on or from a nearby element.

Referring to the embodiments of FIGS. 3A-3D a storage system maintains a Bloom filter for each of one or more search trees. When some service 108 (FIG. 1A) within a storage node 106' needs to determine if a search tree includes information about a particular object, it first queries the search tree's Bloom filter to potentially avoid querying the search tree directly. In some embodiments the search tree may be stored to disk or other type of storage device and, thus, Bloom filters may reduce the number of I/O operations within the system.

Figure 3A:
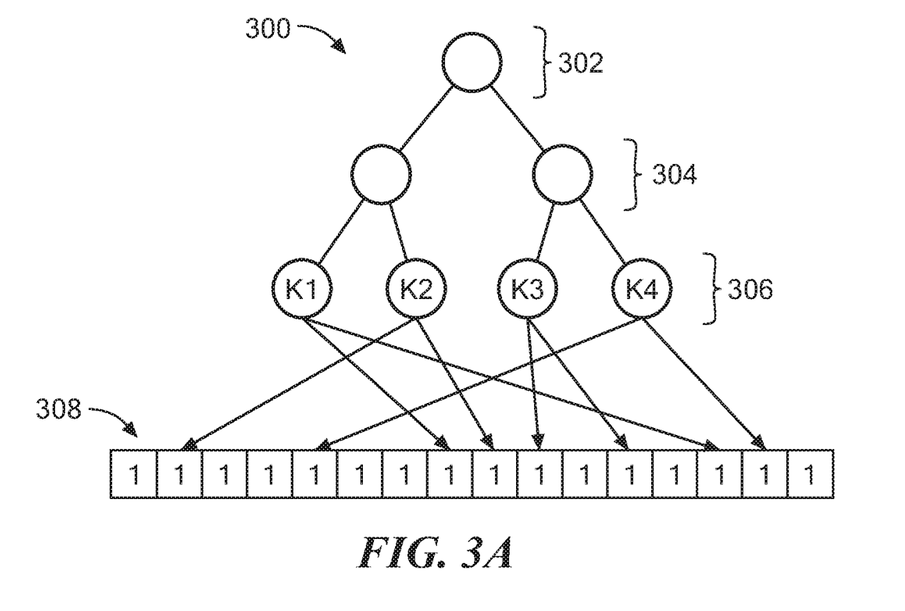
FIGS. 3A-3D are diagrams each showing an illustrative search tree and a corresponding Bloom filter, in accordance with embodiment of the disclosure.

Referring to FIG. 3A, according to one embodiment, a search tree 300 includes a root node 302, internal nodes 304, and leaves 306 to store information about an arbitrary number of objects. In the example of FIG. 3A, the search tree 300 stores information about four (4) objects denoted K1, K2, K3, and K4.

A Bloom filter 308 is maintained for the search tree 300 to potentially reduce I/O operations. In particular, the Bloom filter 308 can be queried to determine, probabilistically, if given object key is stored within the search tree 300. The Bloom filter 308 may return a false positive result, but is guaranteed to not return a false negative result.

The Bloom filter 308 includes m storage positions, each of which stores a binary value (e.g., 0 or 1), where m is referred to as the "capacity" of the filter. The Bloom filter 308 also has k different hash functions, each of which can map an object key to one of the m positions. Initially, each of the m positions is set to zero (0). When an object is added to the search tree 300, the object's key is hashed using each of the k hash functions to obtain k positions in the Bloom filter 308, and each of these k positions is set to one (1). To test whether an object is in the search tree 300, the object's key is hashed using each of the k hash functions to obtain k Bloom filter positions. If any of the k positions is set to zero (0), the Bloom filter 308 reports that the object is definitely not included within the search tree 308. Otherwise, if each of the k positions are set to one (1), the Bloom filter 308 reports that the object is possibly, but not definitely, included within the search tree 308.

In some embodiments, the Bloom filter may be implemented as an array of m bits. In certain embodiments, the Bloom filter may be stored in primary memory, such as random access memory (RAM).

In various embodiments, it may be impossible (or at least impractical) to delete object keys from the Bloom filter. In some embodiments, it may be impossible (or at least impractical) to change the capacity m of a Bloom filter after any of the m positions have been set to one (1).

Referring again to FIG. 3A, the probability that (a) the Bloom filter 308 reports an object key is included within the search tree 300 and (b) the object key is actually included within the search tree 300 is referred to herein as the Bloom filter's "accuracy" or "reliability." The accuracy of the Bloom filter 308 can decrease over time as objects are added to and/or removed from the search tree 300.

In certain embodiments, the accuracy of the Bloom filter may decrease over time as the total number of objects within the search tree increases. In some embodiments, because it may not be possible/practical to delete object keys the Bloom filter, accuracy may decrease as a result of objects being added and removed from the search tree, even if the total number of objects therein does not change.

Referring again to FIG. 3A, the Bloom filter 308 has a capacity m=16 and may have k=2 different hash functions. The hash functions map object keys K1, K2, K3, K4 to two different positions within the Bloom filter 308, as shown. In the example of FIG. 3A, all m positions are set to one (1), which may indicate that objects were previously deleted from the search tree 300 (but not the Bloom filter 308). In some embodiments, one or more heuristics may be used to determine if the Bloom filter should be rebuilt.

According to various embodiments, the occupancy of the search tree is used to determine if a Bloom filter should be rebuilt. In particular, a count may be maintained of the number of objects within the search tree, referred to herein as the "tree object count." In some embodiments, the tree object count is initialized to zero when a new search tree is generated, incremented when objects are added to the tree, and decremented when objects are deleted from the tree. In certain embodiments, a tree object count may be compared to a target object count for the search tree to determine if the Bloom filter should be rebuilt. In some embodiments, the target object count may be determined dynamically. In one embodiment, the target object count for a search tree may be about 12,000,000. In particular embodiments, the capacity m of the Bloom filter may be calculated using the target object count. In some embodiments, a Bloom filter may be rebuilt if the tree object count is greater than X percent of the target object count, where X is a number greater than zero (e.g., 105).

According to several embodiments, another heuristic for determining if a Bloom filter should be rebuilt involves calculating an estimated accuracy for the Bloom filter and comparing the estimated accuracy to a threshold value. In some embodiments, the estimated accuracy may be calculated as:

$$\text{estimated accuracy} = (\text{tree object count}/\text{filter object count})*100, \quad (1)$$

where the "tree object count" is incremented when an object is added to the search tree and decremented when an object is removed from the search tree, and where the "filter object count" is incremented when an object is added to, or updated within, the search tree. Thus, in some embodiments, the estimated accuracy for the Bloom filter may decrease over time, but cannot increase.

Referring back to FIG. 3A, the search tree 300 has an object count of four (4). Assuming that sixteen (16) objects were previously deleted from the search tree 300, the Bloom filter 308 has an object count of twenty (20) and the estimated accuracy of the Bloom filter 308 is (4/20)*100= 20%. In certain embodiments, an estimated accuracy of 20% is below the threshold at which a Bloom filter is rebuilt.

In certain embodiments, a determination may be made to rebuild a Bloom filter based on one or both of the heuristics described above. In some embodiments, rebuilding a Bloom filter includes generating a new Bloom filter, populating the new Bloom filter with object keys, and replacing the old Bloom filter with the new filter. In some embodiments, when a determination is made to rebuild a Bloom filter, the filter is not immediately rebuilt but rather may be rebuilt at the next opportune time. In particular embodiments, a flag is set to indicate that the Bloom filter should be rebuilt.

In various embodiments, a Bloom filter may be rebuilt while tracing garbage collection is being run on a corresponding search tree. In certain embodiments, when garbage collection commences for a search tree, a determination may be made whether the search tree's Bloom filter should be rebuilt. In some embodiments, this includes checking if a flag has been set. If the Bloom filter should be rebuilt, a new Bloom filter may be generated and each of its positions may be initialized to zero (0).

Figure 3B:
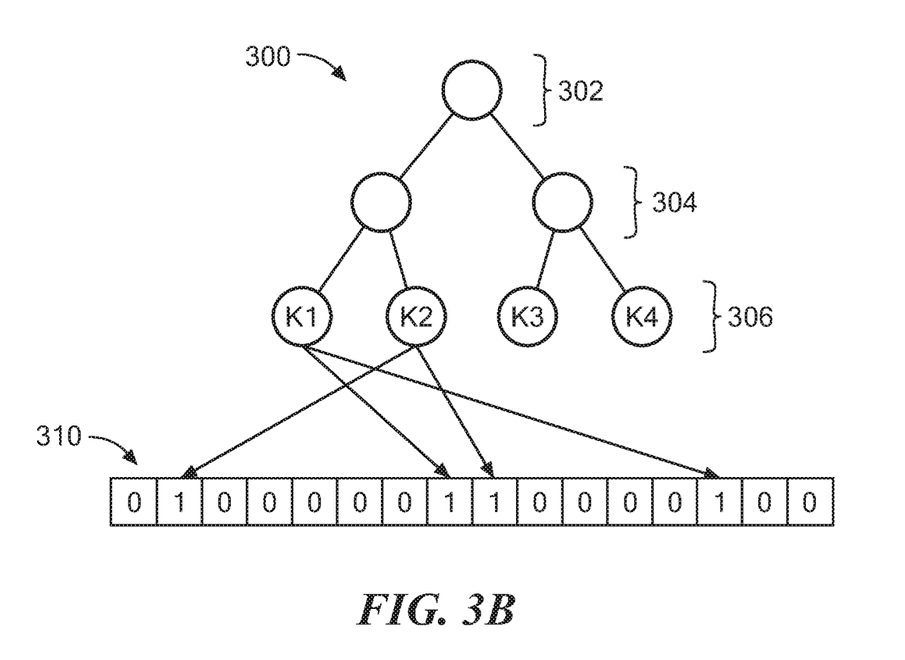

Referring to FIG. 3B, a new Bloom filter 310 is generated when tracing garbage collection is being run on the search tree 300. The new Bloom filter has the same capacity m as the existing filter 308 (FIG. 3A). In other embodiments the new Bloom filter may have a different capacity m than the existing filter. In particular embodiments, the new Bloom filter may have a different capacity m than the existing filter if the tree object count was greater than X percent of the target object count. In some embodiments, the new Bloom filter may have the same capacity m as the existing filter if low estimated accuracy was the reason for a rebuild.

Referring again to FIG. 3B, the garbage collector traces the search tree 300, visiting leaves 306 to determine which object keys are included with the search tree 300. When a leaf 306 is visited, the corresponding object key (e.g., K1, K2, K3, or K4) are added to the new Bloom filter 310 (in addition to other processing that may be performed for the purpose of garbage collection).

In some embodiments, the new Bloom filter is not used (e.g., to process user requests) until the search tree has been completely traced (i.e., until all objects referenced by the search tree have been added to the new Bloom filter). In certain embodiments, prior to a search tree being traced, a previous Bloom filter may be used. In many embodiment, once tracing of a search tree is complete, the previous Bloom filter may be replaced with the new Bloom filter.

As discussed above, in various embodiments, tracing garbage collection may be paused when journal updates are processed for the search tree. In certain embodiments, a tracing garbage collector may use checkpoints to ensure that the entire search tree is eventually traced and thus, that the Bloom filter rebuild will eventually complete. In some embodiments, the last object key visited is used as the checkpoint. In many embodiments, during journal processing, object keys added to the search tree may also be added to the new Bloom filter. In some embodiments, only object keys that are behind the checkpoint (e.g., that are less than the checkpoint object key) are added to the new Bloom filter during journal processing; object keys ahead of the checkpoint may be detected by the tracing garbage collector and added to the new Bloom filter when tracing resumes.

In certain embodiments, an object count for the new Bloom filter may be initialized to zero when the filter is generated and then incremented as objects are added to the filter (e.g., during journal processing and/or tracing).

Referring again to FIG. 3B, the new Bloom filter 310 is populated as tracing garbage collection is run on search tree 300. In the example of FIG. 3B, it is assumed that the garbage collector previously visited leaves K1 and K2, and that these object keys were added to the new Bloom filter 310 using k=2 different hash functions. As a result, the Bloom filter 310 has a "filter object count" equal to two (2) and has four (4) positions being set to one (1). Also in this example, it is assumed that tracing garbage collection paused for journal processing, with the last visited object key K2 used as the checkpoint. It is further assumed that, at the time of pausing, the search tree's journal includes the four updates shown in TABLE 1.

TABLE 1

| Journal Updates |
| --- |
| Delete K1 |
| Add K5 |
| Delete K3 |
| Add K6 |

Figure 3C:
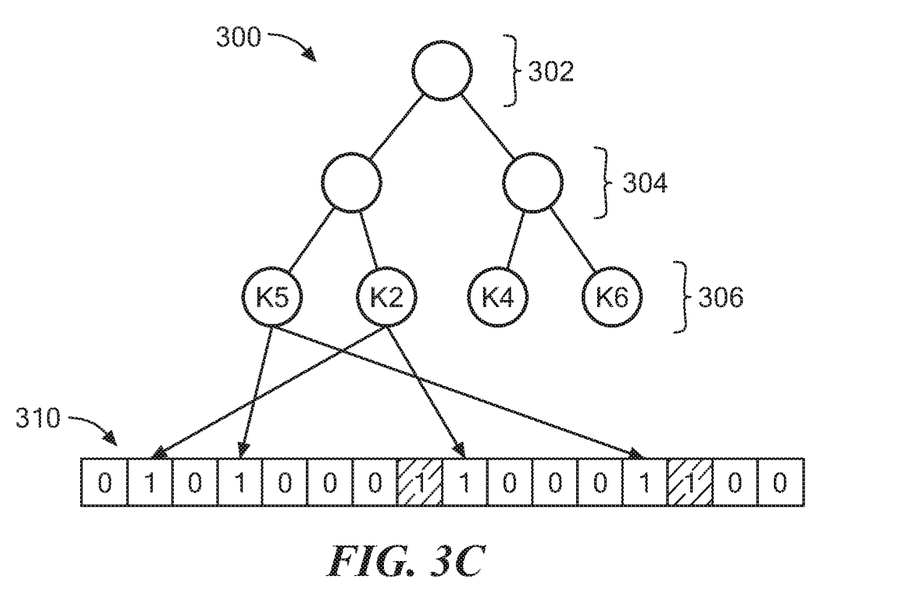

FIG. 3C illustrates the state of the search tree 300 and Bloom filter 310 after journal processing completes, according to some embodiments. The added object K5 is behind the garbage collector checkpoint (e.g., K5 may be less than K2) and, thus, is added to the new Bloom filter 310 during journal processing. The filter object count is incremented by one (e.g., from 2 to 3). The other added object, K6, is ahead of the checkpoint (e.g., K6 may be greater than K2) and, thus, is not be added to the new Bloom filter 310 during journal processing. The tree object count remains unchanged as a result of the illustrated journal processing.

In some embodiments, objects deleted during journal processing (e.g., K1) may be ignored for the purposes of rebuilding the Bloom filter. However, as indicated by hatching in FIG. 3C, the deleted objects may leave positions within the Bloom filter 310 set to one (1) even though no object keys within the search tree 300 hash to those positions, thereby decreasing the accuracy of the Bloom filter 310.

Figure 3D:
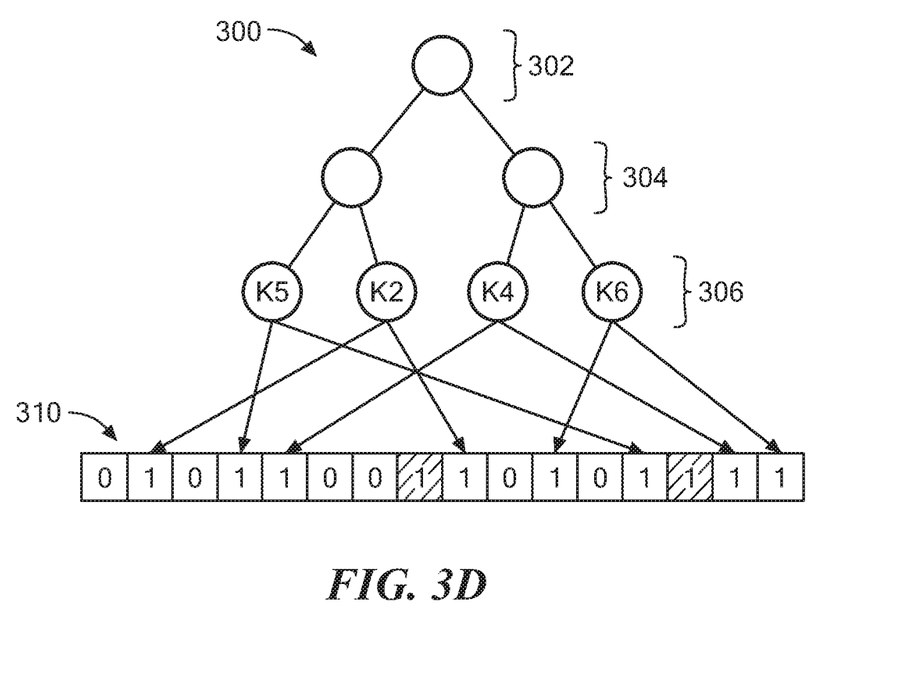

Referring to FIG. 3D, after journal processing completes, the tracing garbage collector may resume from a tree location selected based on the checkpoint, according to some embodiments. In the example of FIG. 3D, tracing resumes by visiting leaves K4 and K6, and these object keys may be added to the new Bloom filter 310. In some embodiments, this may result in the filter object count being incremented by two (e.g., from 3 to 5).

Referring again to FIG. 3D, the new Bloom filter 310 may be more accurate compared to the previous Bloom filter 308 (FIG. 3A). The accuracy of the new Bloom filter 310 can be estimated using Equation (1) above: $(4/5)*100=80\%$. In certain embodiments, an estimated accuracy of 80% is above the threshold used to determine if the Bloom filter should be rebuilt.

Figure 4:
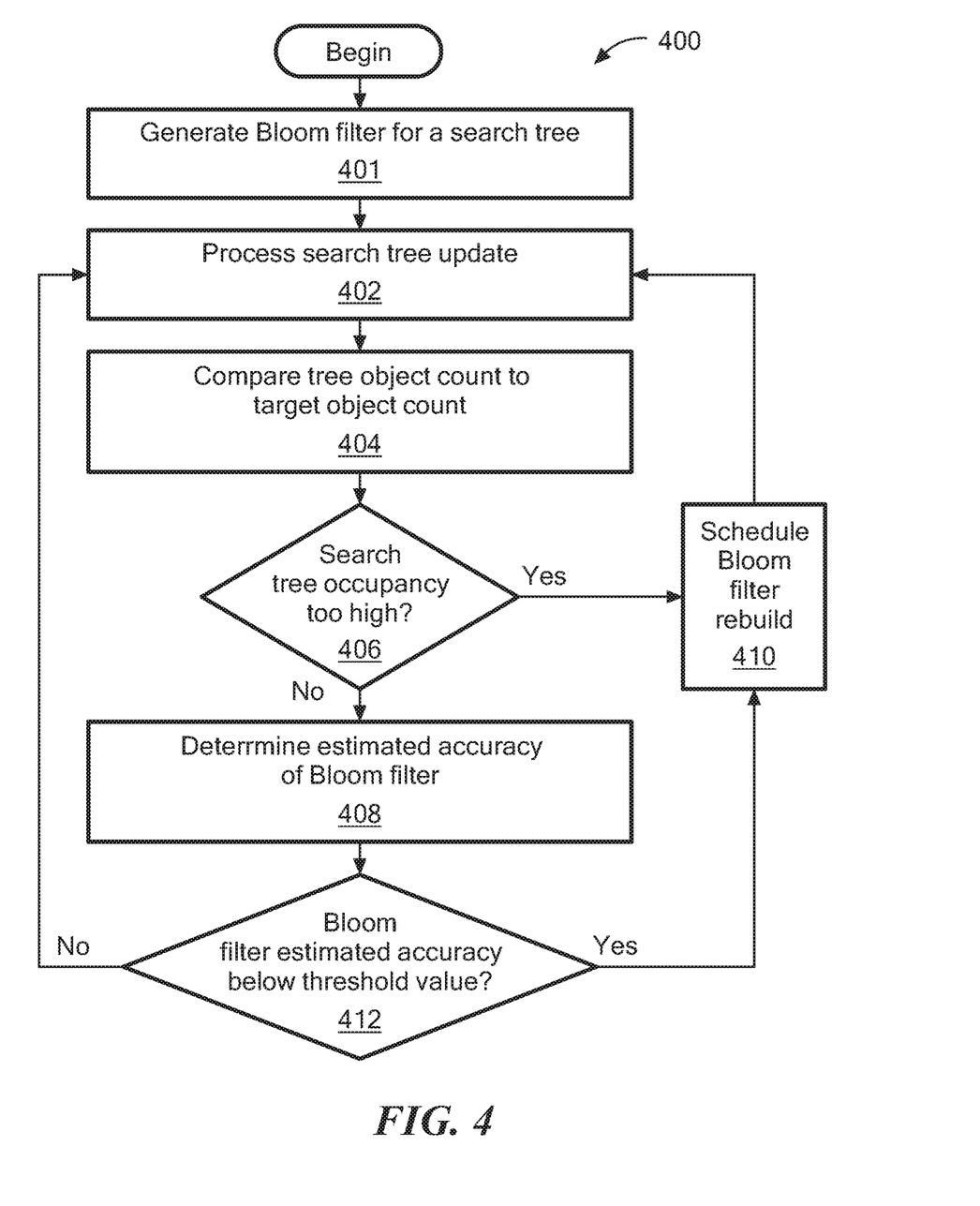
FIG. 4 is a flow diagram showing an illustrative process that may be used within the systems of FIGS. 1 and 1A, in accordance with an embodiment of the disclosure.
Figure 5:
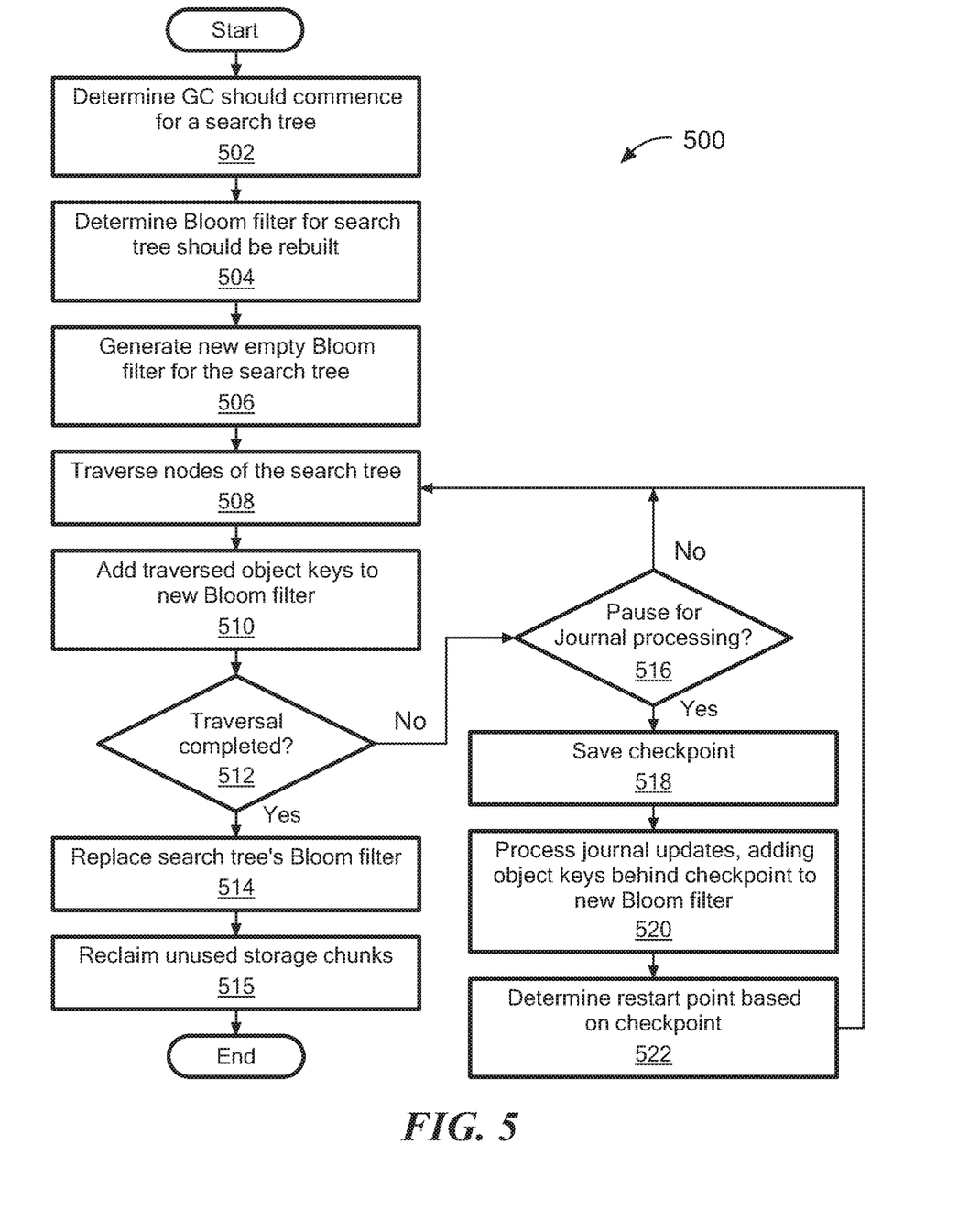
FIG. 5 is a flow diagram showing another illustrative process that may be used within the systems of FIGS. 1 and 1A, in accordance with an embodiment of the disclosure.

FIGS. 4 and 5 are flow diagrams showing illustrative processing in accordance with certain embodiments of the disclosure. In some embodiments, the processing shown in these figures and described below in conjunction therewith may be implemented within one or more nodes 106 of storage system 100 (FIG. 1). Rectangular elements (typified by element 401 of FIG. 4) herein denoted "processing blocks," represent computer software instructions or groups of instructions. Diamond shaped elements (typified by element 406 of FIG. 4) herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4, an illustrative process 400 may be used to schedule Bloom filter rebuilds, according to some embodiments. At block 401, a Bloom filter may be generated for a search tree. In some embodiments, a filter object count is initialized to zero (0). In various embodiments, the search tree has an associated tree object count, which may have been initialized to zero (0) when the search tree was generated.

Referring back to FIG. 4, at block 402, a search tree update may be processed. The search tree update may correspond to a request to add an object to the search tree, to remove an object from the search tree, or to update an object within the search tree. In some embodiments, the tree update is processed as part of journal processing. In some embodiments, processing the search tree update includes incrementing or decrementing the tree object count. In certain embodiments, processing a tree update includes adding an object to the Bloom filter. In some embodiments, processing a tree update includes incrementing the filter object count.

In some embodiments, a determination is made to rebuild the Bloom filter based on one or more statistics. In the embodiment of FIG. 4, such statistics may include the tree object count and the filter object count, as described next.

Referring again to FIG. 4, at block 404, the tree object count may be compared to a target object count for the search tree. In some embodiments, the target object count may be determined when the search tree and/or the Bloom filter is generated.

Referring back to FIG. 4, at block 406, if the search tree occupancy is too high, then a Bloom filter rebuild may be scheduled (block 410). In some embodiments, a Bloom filter rebuild may be scheduled if the tree object count is greater than X percent of the target object count, where X is a number greater than zero. In one embodiment, $X \approx 105$. In some embodiments, if the search tree occupancy is not too high, processing may continue. In the embodiment of FIG. 3, processing may continue at block 408.

Referring again to FIG. 4, at block 408, an estimated accuracy of the Bloom filter may be determined. In some embodiments, this includes using Equation (1) along with the tree object count and filter object count values.

Referring again to FIG. 4, at block 412, if the estimated accuracy is less than a threshold value, then a Bloom filter rebuild may be scheduled (block 410). In some embodiments, scheduling a Bloom filter rebuild may include setting a flag.

Referring again to FIG. 4, the process may repeat from block 402.

Referring to FIG. 5, an illustrative process 500 rebuilds a Bloom filter during garbage collection, according to some embodiments. At block 502, a determination is made that garbage collection should run for a given search tree 502. In some embodiments, a scheduler may be used to determine when garbage collection should run and/or which search trees should be processed during garbage collection. In certain embodiments, the scheduler balances the benefits of garbage collection (i.e., reclaimed storage capacity) against the costs of running garbage collection (e.g., increased processing and I/O load).

Referring again to FIG. 5, at block 504, a determination is made that a Bloom filter associated with the search tree should be rebuilt. In some embodiments, this includes checking if a rebuild has been scheduled since the last garbage collection completed for the search tree. In certain embodiments, checking if a rebuild has been scheduled since the last garbage collection completed comprises checking if a flag has been set.

Referring back to FIG. 5, at block 506, a new Bloom filter is generated with m positions and k different hash functions. In some embodiments, the new Bloom filter may have a different capacity m than the existing filter if the rebuild was caused by the search tree occupancy being too high (block 406 in FIG. 4). In certain embodiments, the new Bloom filter may have the same capacity m as the existing filter if low estimated accuracy was the reason for a rebuild (block 412 in FIG. 4). In some embodiments, generating a new Bloom filter may include allocating memory for the m positions and initializing the m positions to zero (0). In some embodiments, an array of m bits may be allocated. In certain embodiments, the capacity m may be determined using the target object count for the search tree.

Referring again to FIG. 5, the new Bloom filter is populated as part of a tracing garbage collection. At block 508, the garbage collector traverses the search tree, starting from the root node. In some embodiments, the garbage collector performs a depth-first traversal of the search tree. In certain embodiments, the garbage collector may detect and maintain a list of unused storage chunks during traversal.

Referring again to FIG. 5, at block 510, as leaves of the tree of search tree are visited by the garbage collector, the object keys stored therein are hashed using each of the k hash functions and the corresponding Bloom filter positions are set to one (1).

At block 516, the tracing garbage collector pauses to process journal updates for the search tree. In some embodiments, the tree journal limits the number of pending updates and forces journal processing to commence when the limit is reached.

Referring again to FIG. 5, at block 518, a checkpoint is saved when garbage collection pauses. In some embodiments, the checkpoint includes the last object key visited.

Referring again to FIG. 5, at block 520, journal updates are processed. If an update results in an object being added to the search tree, then the object's key is added to the new Bloom filter. In some embodiments, the object key is only added to the new Bloom filter if it is behind the garbage collection checkpoint. In certain embodiments, the object key may also be added to the old Bloom filter.

Referring again to FIG. 5, at block 522, after journal processing completes, garbage collection resumes from a tree location determined by the checkpoint. In some embodiments, garbage collection resumes from a leaf node comprising an last object key indicated by the checkpoint, or the first object key to the left of the checkpoint (e.g., in the case where the checkpoint object key was deleted).

Referring back to FIG. 5, after the entire search tree has been traversed (block 512), the search tree's Bloom filter is replaced with the new Bloom filter (block 514). In certain embodiments, the Bloom filter rebuild flag may be cleared, allowing subsequent rebuilds to be scheduled as needed.

Referring again to FIG. 5, at block 515, the unused storage chunks detected by the garbage collector is reclaimed using any suitable technique.

Figure 6:
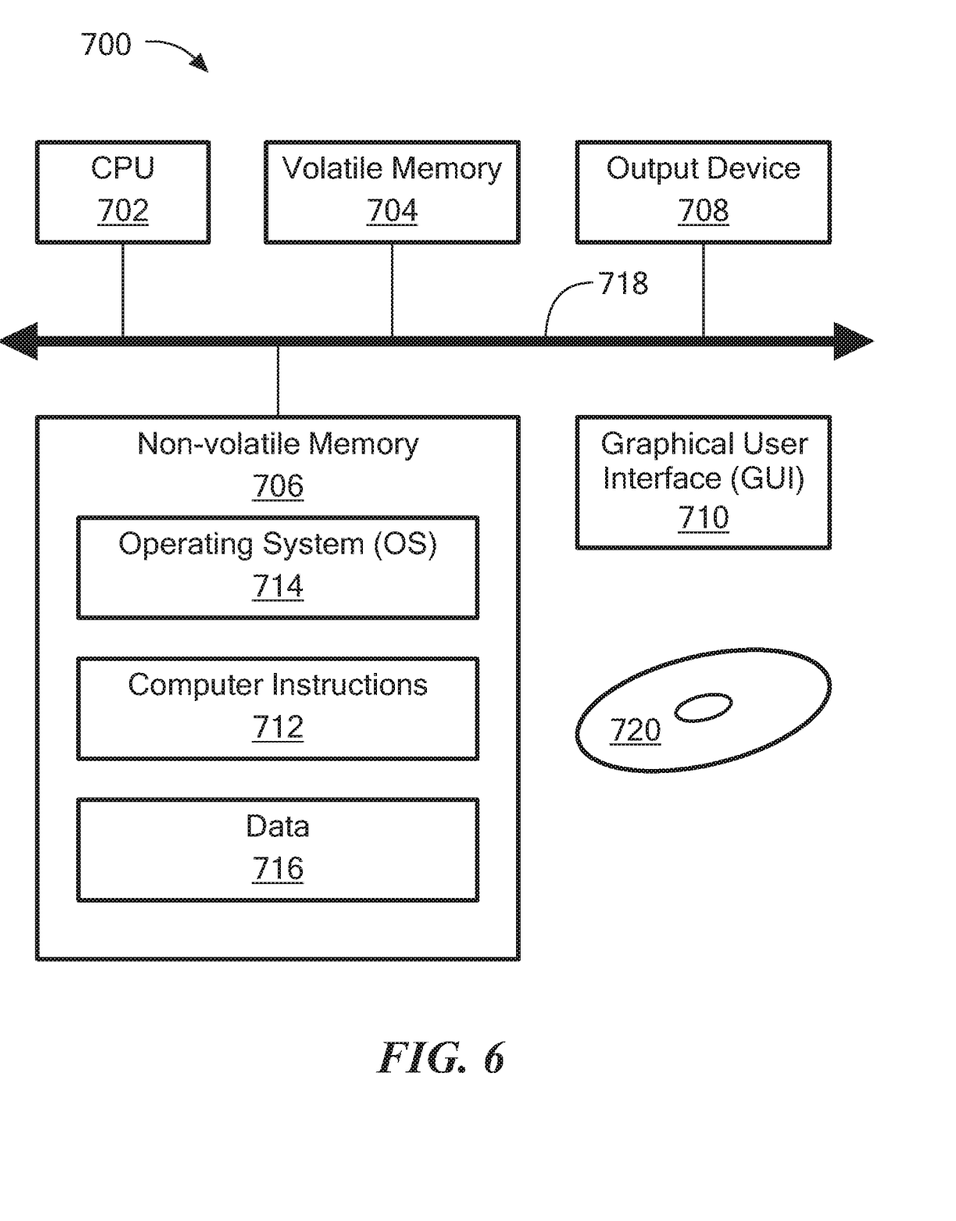
FIG. 6 is a schematic representation of an illustrative computer for use with the systems of FIGS. 1 and 1A, in accordance with an embodiment of the disclosure.

FIG. 6 shows an illustrative computer or other processing device 700 that can perform at least part of the processing described herein, according to an embodiment of the disclosure. The computer 700 includes a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 stores computer instructions 712, an operating system 714, and data 716. In one example, the computer instructions 712 are executed by the processor 702 out of volatile memory 704. In one embodiment, an article 720 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more a physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method comprising:
   processing an update to search tree, the search tree storing information about one or more objects indexed by corresponding object keys;
   determining an estimated accuracy for a first Bloom filter based on a ratio of a tree object count and a filter object count, wherein; (i) the tree object count includes a count of objects that are currently stored in the search tree, and (ii) the filter object count includes a sum of the count of objects that are currently stored in the search tree and a count of objects that have been deleted from the search tree;
   determining to rebuild the first Bloom filter based on the estimated accuracy, the first Bloom filter associated with the search tree;
   generating a second Bloom filter associated with the search tree;
   populating the second Bloom filter as part of a tracing garbage collection process, the populating including visiting any of a plurality of leaves in the search tree by the trace garbage collection process, and adding, to the second Bloom filter, an object key that corresponds to a leaf; and
   replacing the first Bloom filter with the second Bloom filter.

2. The method of claim 1 wherein processing the update to the search tree comprises:
   if the update includes adding an object to the search tree, adding Information about the object to the search tree indexed by a corresponding object key, adding the corresponding object key to the first Bloom filter, incrementing the object count, and incrementing the filter object count; and
   if the update includes deleting an object to the search tree, deleting information about the object from the search tree and decrementing the tree object count.

3. The method of claim 2 further comprising;
   determining a target object count for the search tree,
   wherein determining to rebuild the first Bloom filter is further based on comparing the target object count and the tree object count.

4. The method of claim 3 further comprising generating the first Bloom filter having a capacity determined using the target object count for the search tree.

5. A system comprising:
   one or more processors;
   a volatile memory; and
   a non-volatile memory storing computer program code that when executed on the processor causes execution across the one or more processors of a process operable to perform the operations of:
   processing an update to a search tree, the search tree storing information about one or more objects indexed by corresponding object keys:
   determining an estimated accuracy for a first Bloom filter based on a ratio of a tree object count and a filter object count, wherein; (i) the tree object count includes a count of objects that are currently stored in the search tree, and (ii) the filter object count includes a sum of the count of objects that are currently stored in the search tree and a count of objects that have been deleted from the search tree;
   determining to rebuild the first Bloom filter based on the estimated accuracy, the first Bloom filter associated with the search tree;
   generating a second Bloom filter associated the search tree:
   populating the second Bloom filter as part of a tracing garbage collection process, the populating including visiting any of a plurality of leaves in the search tree by the trace garbage collection process, and adding, to the second Bloom filter, an object key that corresponds to a leaf; and
   replacing the first Bloom filter with the second Bloom filter.

6. The system of claim 5 wherein processing the update to the search tree comprises:
   if the update includes adding an object to the search tree, adding information about the object to the search tree indexed by a corresponding object key, adding the corresponding object key to the first Bloom filter, incrementing the tree object count, and incrementing the filter object count; and
   if the update includes deleting an object to the search tree, deleting information about the object from the search tree and decrementing the tree object count.

7. The system of claim 6 wherein the process is further operable to perform the operation of determining a target object count for the search tree, and determining to rebuild the first Bloom filter is further based on comparing the target object count and the tree object count.

8. The system of claim 7 wherein the process is further operable to perform the operation of generating the first Bloom filter having a capacity determined using the target object count for the search tree.

9. A computer program product tangibly embodied in a non-transitory computer-readable medium, the computer-readable medium storing program instructions that are executable to:
   process an update to a search tree, the search tree storing information about one or more objects indexed by corresponding object keys;
   determining an estimated accuracy for a first Bloom filter based on a ratio of a tree object count and a filter object count, wherein: (i) the tree object count includes a count of objects that are currently stored in the search tree, and (ii) the filter object count includes a sum of the count of objects that are currently stored in the search tree and a count of objects that have been deleted from the search tree;
   determine to rebuild the first Bloom filter based on the estimated accuracy, the first Bloom filter associated with the search tree;
   generate a second Bloom filter associated with the search tree;
   populate the second Bloom filter as part of a tracing garbage collection process, the populating including visiting any of a plurality of leaves in the search tree by the trace garbage collection process, and adding, to the second Bloom filter, an object key that corresponds to a leaf; and
   replace the first Bloom filter with the second Bloom filter.

10. The computer program product of claim 9 wherein processing the update to the search tree comprises:

if the update includes adding an object to the search tree, adding information about the object to the search tree indexed by a corresponding object key, adding the corresponding object key to the first Bloom filter, incrementing the tree object count, and incrementing the filter object count; and if the update includes deleting an object to the search tree, deleting information about the object from the search tree and decrementing the tree object count.

11. The computer program product of claim 10, the computer-readable medium storm program instructions that are further executable to:

determining a target object count for the search tree, wherein determining to rebuild the first Bloom filter is further based on comparing the target object count and the tree object count.

12. The computer program product of claim 11, the computer-readable medium storing program instructions that are further executable to generate the first Bloom filter having a capacity determined using the target object count for the search tree.

\* \* \* \* \*